United States Patent Office 2,790,002
Patented Apr. 23, 1957

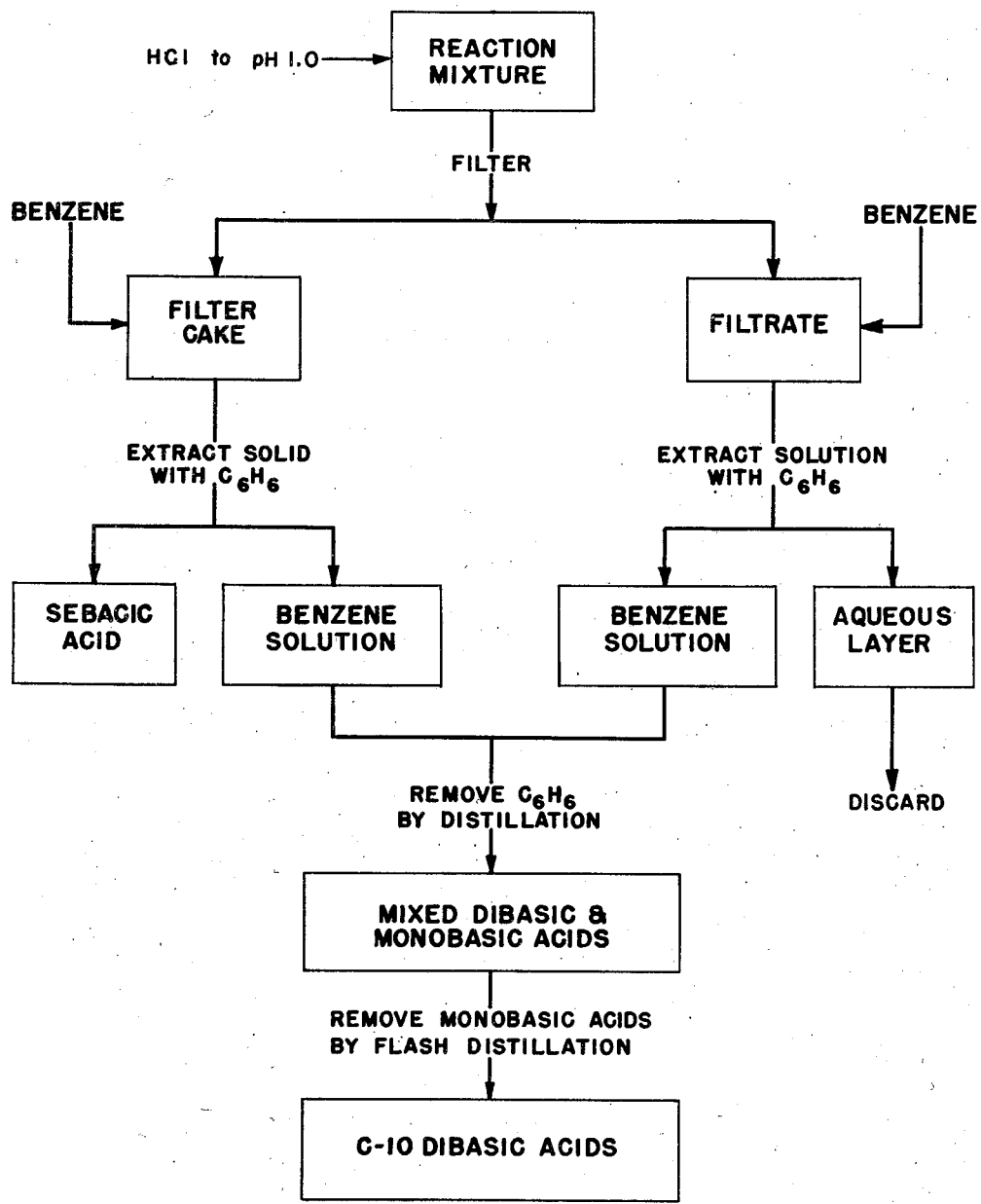

2,790,002

PROCESS FOR RECOVERY OF ACIDS FROM AQUEOUS MIXTURES OF SALTS OF THE ACIDS

Charles E. Frank, Cincinnati, Ohio, and Walter E. Foster, Baton Rouge, La., assignors to National Distillers Products Corporation, New York, N. Y., a corporation of Virginia Application February 16, 1954, Serial No. 410,497

13 Claims. (Cl. 260—537)

This invention relates generally to a method for isolating and separating acids into relatively pure fractions and more particularly to a novel and highly effective method for recovering pure sebacic acid from other acidic reaction products.

It has recently been found that an aliphatic conjugated diolefin can be treated with finely dispersed sodium or potassium in a selected ether medium and in the presence of a relatively small amount of polycyclic aromatic hydrocarbon at a temperature preferably below 0° C. to give a mixture of dimetallo derivatives of the dimerized diolefin. These dimetallo derivatives can then be carbonated at a temperature below 0° to give the corresponding salts of dicarboxylic acids in high yields and selectivities.

In the case of the initial reaction using sodium and butadiene, the product obtained comprises the disodium derivatives of the aliphatic isomeric octadienes. Studies of the structures of the saturated diacids arising therefrom after carbonation and hydrogenation indicate that mixtures of isomeric C–10 dicarboxylic acids are obtained. Thus following final hydrogenation and acidification, the product mixture yields sebacic acid, 2-ethylsuberic acid, 2,2'-diethyl adipic acid, together with small amounts of other acids including monobasic carboxylic acids.

In the preferred type of operation, the butadiene and finely dispersed sodium are reacted in an active ether solvent preferably in the presence of a polycyclic aromatic hydrocarbon. The disodioctadienes formed are subsequently carbonated to the sodium salts of the unsaturated C–10 acids. Organic solvents are then removed and the solids are converted to an aqueous solution, which is preferably filtered prior to hydrogenation. A catalytic hydrogenation is then carried out to convert the sodium salts of all acidic compounds to completely saturated salts.

The resulting final aqueous reaction mixture contains varying amounts of isomeric C–10 dicarboxylic acids including the linear isomer sebacic acid, as sodium salts. It also contains the salts of the valuable branched chain C–10 acids as well as certain monobasic acids of varying molecular weights including C–5, C–9 and higher. There are also present relatively smaller amounts of impurities such as hydrogenating catalyst, condenser polymeric acids, and the like. It is this aqueous mixture which serves as starting material for the separation method of this invention.

It may be found desirable to carry out an initial "test" titration in order to determine accurately the free alkali and total organic acid content. This information is of value in order to establish the necessary amount of acid to be added.

The invention will be better understood by a reference to the accompanying general flow plan.

Following the outlines of the flow plan, the total aqueous reaction mixture is acidified to a pH of about 1.0 with a strong mineral acid, suitable examples of which include hydrochloric acid and sulfuric acid, filtered, and the filter cake washed with benzene, toluene or other inert aromatic hydrocarbon; for best results it is desirable to dry the filter cake before the hydrocarbon solvent is used. Benzene is the preferred solvent since it possesses an optimum selectivity in its solvent action on the acids present in the mixture. Thus, all the acids present except sebacic acid are soluble in benzene.

Because of this selective solvent action, the resultant sebacic acid is of high purity having a melting point in the range of 131 to 133° C.; the recovery is about 90–95% of the total sebacic acid present in the reaction mixture. The aqueous filtrate from the initial precipitation is extracted with additional benzene to remove small amounts of monobasic acids, as well as the dibasic acids other than sebacic acid, including 2-ethylsuberic, and 2,2'-diethyladipic acids which remain in solution. The benzene solutions from the solid and aqueous extractions then are preferably combined, and the benzene removed by distillation to yield a mixed monobasic and dibasic acid fraction from which essentially all of the sebacic acid has been removed. This mixed acid fraction may be further purified by flash distillation of the monobasic acid components and by a carbon black treatment of the crude 2-ethylsuberic and 2,2'-diethyladipic mixture. These can be purified still further by other techniques, if desired.

The invention will be described in further detail by the following example although it is not intended to limit it specifically thereto. The parts are by weight unless otherwise stated.

Example

This experiment was carried out using an aqueous solution of the sodium salts of the total acids including both dibasic and monobasic acids of the organic series. It was obtained by the above described series of reactions including a catalytic hydrogenation.

There was used 550 parts of the mixture containing about 101 parts of acids as detected by preliminary experiments. This solution was stirred while maintaining a temperature of 70–80° C. during the addition of sufficient 12N HCl to liberate substantially all of the organic acids from their sodium salts. This necessitates that the mixture be acidified to a pH of about 1.0. The acidified mixture was then cooled to allow crystal growth of the precipitate and thereby facilitate subsequent filtration. The cooled mixture was filtered and pressed to remove the bulk of the aqueous layer. The precipitate was then dried before proceeding to the benzene extraction.

The dried filter cake was washed with three portions of 220 parts each of hot benzene to remove the remaining benzene soluble acids. This was done most efficiently by preparing a slurry of the solid filter cake containing the acids with the benzene in each case, and allowing the mixture to digest a few minutes before withdrawing the benzene phase. Evaporation of residual benzene from the final filter cake yielded 30 parts of sebacic acid, M. P. 131.5–132.5° C.

The aqueous filtrate from the original acid precipitation was extracted with three portions of 110 parts each of benzene to remove portions of the more water soluble acids remaining in this phase. These benzene extracts were then added to the benzene solution from the sebacic acid wash. The combined benzene solution was treated with a small amount of carbon black to remove traces of colored impurities. Removal of the benzene by distillation yielded 70 parts of 2-ethylsuberic and 2,2'-diethyladipic acids containing only small amounts of monobasic acids and of sebacic acid. The former may be largely removed by a simple flash distillation, thereby yielding the two isomeric C–10 dibasic acids as the second major product of the separation process.

What is claimed is:

1. A process for separation and purification of acidic compounds from an aqueous mixture containing alkali metal salts of monobasic and dibasic acids including substantial amounts of alkali metal salts of sebacic acid and other isomeric C–10 acids, said mixture having been obtained by hydrogenation of a reaction mixture obtained from carbonation of dialkali metal octadienes, which comprises the steps of adding mineral acid to liberate substantially all of the organic acids from their salts, filtering said mixture, contacting both the resulting solid and aqueous phases with an inert aromatic hydrocarbon solvent that selectively and substantially removes organic acids other than sebacic acid from said solid, recovering substantially pure sebacic acid as the hydrocarbon insoluble product, and recovering a hydrocarbon solution of a mixture of monobasic acids and C–10 isomeric dibasic acids other than sebacic acid.

2. The process according to that described in claim 1 in which the aromatic hydrocarbon solvent is benzene and the mineral acid added is HCl.

3. A process for separation and purification of acidic compounds from an aqueous mixture containing alkali metal salts of monobasic and dibasic acids including substantial amounts of alkali metal salts of sebacic acid and other isomeric C–10 acids, said mixture having been obtained by reacting an alkali metal with butadiene to prepare a mixture comprising dialkali metal octadienes followed by carbonation and hydrogenation of said mixture to convert said dialkali metal octadienes to dialkali metal salts of $C_{10}$ saturated aliphatic diacids including sebacic acid and isomers thereof, which comprises the steps of adding mineral acid to liberate substantially all of the organic acids from their salts, filtering said mixture, contacting both the resulting solid and aqueous phases with an inert aromatic hydrocarbon solvent that selectively and substantially removes organic acids other than sebacic acid from said solid, recovering sebacic acid as the hydrocarbon insoluble product, and recovering a mixture of monobasic acids and C–10 isomeric dibasic acids other than sebacic acid from the resulting hydrocarbon solution.

4. A process according to that described in claim 3 in which the aromatic hydrocarbon solvent is benzene, and the mineral acid added is HCl.

5. A process for separation and purification of acids from an aqueous mixture containing sodium salts of monobasic acids, and substantial amounts of sodium salts of dibasic acids, obtained by hydrogenation of a reaction mixture obtained from carbonation of disodiooctadienes, which comprises the steps of adding mineral acid to liberate substantially all of the organic acids from their salts, filtering said mixture, extracting both the resulting solid and aqueous phases with benzene, recovering substantially pure sebacic acid as the benzene insoluble product, and recovering a mixture of monobasic acids and C–10 isomeric dibasic acids other than sebacic acid from the resulting benzene solution.

6. A process for separation and purification of acids and diacids from an aqueous mixture containing sodium salts of monobasic acids, and substantial amounts of sodium salts of C–10 dibasic acids, obtained by hydrogenation of a reaction mixture obtained from carbonation of disodiooctadienes, which comprises the steps of adding mineral acid to a pH of about 1.0, filtering said mixture, contacting both the resulting filter cake and the aqueous mixture with benzene, recovering substantially pure sebacic acid as the benzene insoluble product, and recovering a mixture of monobasic acids and C–10 isomeric dibasic acids other than sebacic acid from the resulting benzene solution.

7. The process according to that described in claim 6 in which the mineral acid added is HCl.

8. The process according to that described in claim 6 in which the mineral acid added is $H_2SO_4$.

9. A process for separation of sebacic acid from an aqueous mixture containing alkali metal salts of monobasic and dibasic acids including substantial amounts of alkali metal salts of sebacic acid and other isomeric C–10 acids, said mixture having been obtained by hydrogenation of a reaction mixture obtained from carbonation of dialkali metal octadienes, which comprises the steps of adding mineral acid to liberate substantially all of the organic acids from their salts whereby to form a precipitate comprising sebacic acid and contacting the precipitate with an inert aromatic hydrocarbon solvent that selectively and substantially removes organic acids other than sebacic acid from said precipitate whereby to recover substantially pure sebacic acid.

10. A process for separation of sebacic acid from an aqueous mixture containing sodium salts of monobasic and dibasic acids obtained by hydrogenation of a reaction mixture obtained from carbonation of disodiooctadienes which comprises adding a mineral acid to liberate substantially all of the organic acids from their salts, filtering the resulting mixture, contacting the resulting filter cake with an inert aromatic hydrocarbon solvent that selectively and substantially removes organic acids other than sebacic acid from said filter cake, and recovering substantially pure sebacic acid as the hydrocarbon insoluble product.

11. A process, as defined in claim 10, wherein the hydrocarbon solvent is a benzene hydrocarbon.

12. A process, as defined in claim 10, wherein the mineral acid is hydrochloric acid.

13. A process, as defined in claim 10, wherein the solvent is a benzene hydrocarbon, the mineral acid is hydrochloric acid, and hydrochloric acid is added to the aqueous mixture in an amount sufficient to provide a pH of about 1.0.

References Cited in the file of this patent
UNITED STATES PATENTS 2,749,364  Greenberg _____ June 5, 1956